(12) United States Patent
Hahn

(10) Patent No.: US 12,583,302 B2
(45) Date of Patent: Mar. 24, 2026

(54) ELECTRIC DRIVE TRAIN FOR A MOTOR VEHICLE, IN PARTICULAR FOR A MOTOR CAR

(71) Applicant: MERCEDES-BENZ GROUP AG, Stuttgart (DE)

(72) Inventor: Peter Hahn, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/107,169

(22) PCT Filed: Jul. 21, 2023

(86) PCT No.: PCT/EP2023/070380
§ 371 (c)(1),
(2) Date: Feb. 27, 2025

(87) PCT Pub. No.: WO2024/046655
PCT Pub. Date: Mar. 7, 2024

(65) Prior Publication Data
US 2026/0077637 A1      Mar. 19, 2026

(30) Foreign Application Priority Data
Aug. 29, 2022    (DE) ..................... 10 2022 003 149.3

(51) Int. Cl.
*B60K 1/02*          (2006.01)
*B60K 17/16*        (2006.01)
(Continued)

(52) U.S. Cl.
CPC ................ *B60K 1/02* (2013.01); *B60K 17/16* (2013.01); *F16H 37/0806* (2013.01);
(Continued)

(58) Field of Classification Search
CPC ...... F16H 37/0806; F16H 48/06; F16H 48/22; F16H 48/24; F16H 2048/364;
(Continued)

(56) References Cited

U.S. PATENT DOCUMENTS 7,427,252 B2     9/2008  Holmes
9,494,218 B2    11/2016  Honda
(Continued)

FOREIGN PATENT DOCUMENTS

CN          113022227 A       6/2021
DE      102022001620 A1 * 11/2023    .......... B60L 15/2036
WO    WO-2023198433 A1 * 10/2023    ............. F16H 48/36

OTHER PUBLICATIONS

International Search Report and Written Opinion mailed Oct. 17, 2023 in related/corresponding International Application No. PCT/EP2023/070380.

(Continued)

*Primary Examiner* — Roger L Pang
(74) *Attorney, Agent, or Firm* — PATENT PORTFOLIO BUILDERS PLLC

(57)          ABSTRACT

An electric drive train for a motor vehicle having first and second electric engines and a planetary gearbox which has a first shaft, a second shaft, a third shaft, a fourth shaft and a fifth shaft, and first and second vehicle wheels. With regard to a torque flow originating from the electric engines running to the vehicle wheels, the electric engines are arranged upstream of the planetary gearbox, which is arranged upstream of the vehicle wheels in the torque flow. A first switching element is provided to couple the second rotor to the first shaft.

11 Claims, 3 Drawing Sheets

Figure 1:
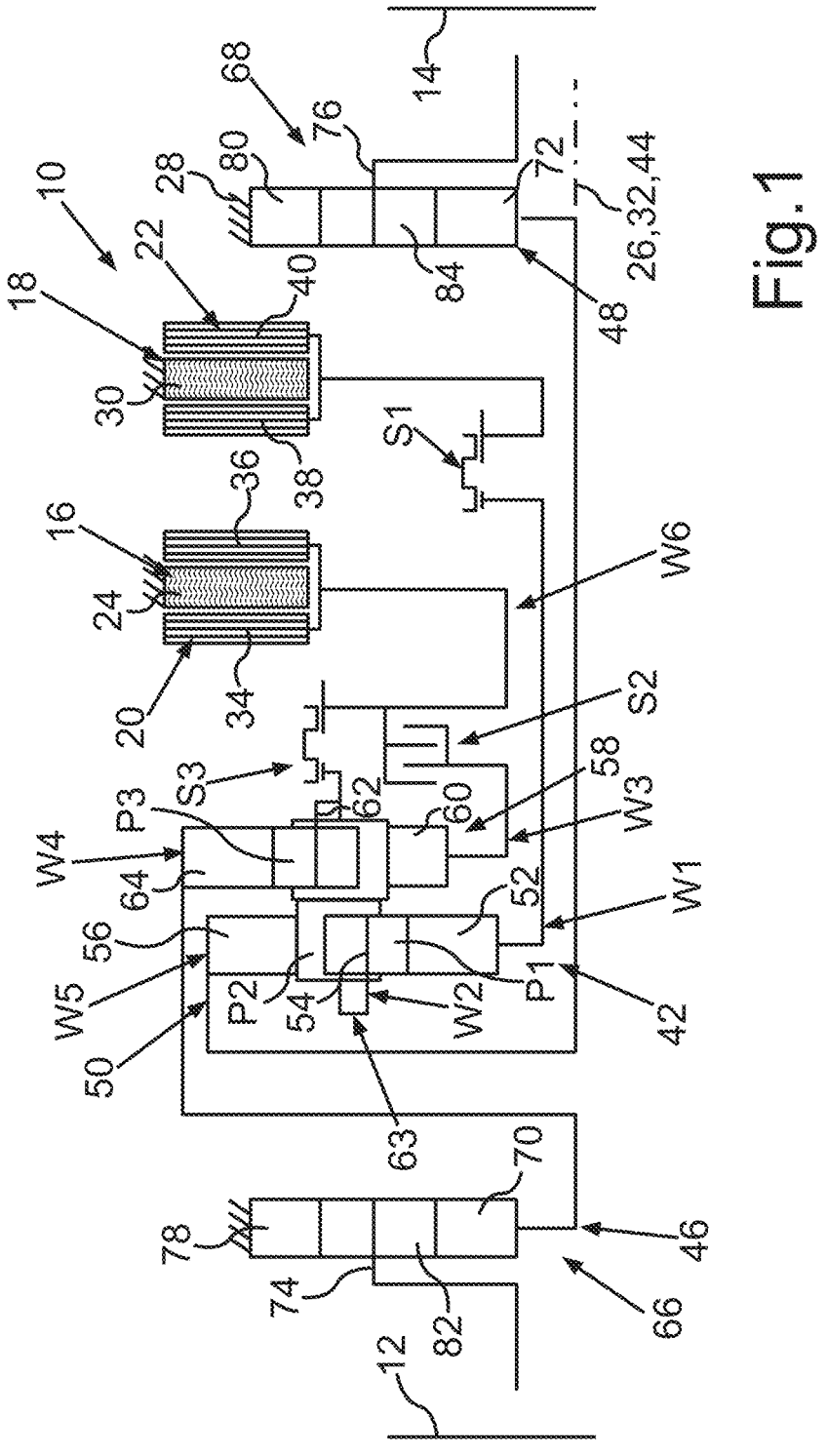

(51) Int. Cl.
    *F16H 37/08*        (2006.01)
    *F16H 48/06*        (2006.01)
    *F16H 48/36*        (2012.01)

(52) U.S. Cl.
    CPC ........ *F16H 48/06* (2013.01); *B60Y 2400/804*
        (2013.01); *F16H 2048/364* (2013.01); *F16H*
        *2048/368* (2013.01)

(58) Field of Classification Search
    CPC ..... F16H 2048/368; B60K 1/02; B60K 17/16;
        B60K 17/165; B60Y 2400/804
    USPC .... 475/5, 150, 151, 225; 180/6.5, 65.6, 65.7
    See application file for complete search history.

(56)             References Cited

U.S. PATENT DOCUMENTS

| | | | | |
|---|---|---|---|---|
| 11,124,064 | B2 | 9/2021 | Kaltenbach et al. | |
| 11,958,348 | B2 * | 4/2024 | Raeder ................... | B60K 17/16 |
| 12,228,198 | B1 * | 2/2025 | Appeltauer ............ | F16H 48/11 |
| 12,305,738 | B1 * | 5/2025 | Schilder ............... | B60K 17/046 |
| 2022/0364631 | A1 * | 11/2022 | Glückler .................. | F16H 3/78 |

OTHER PUBLICATIONS

Office Action created Apr. 4, 2023 in related/corresponding DE Application No. 10 2022 003 149.3.

\* cited by examiner

ELECTRIC DRIVE TRAIN FOR A MOTOR VEHICLE, IN PARTICULAR FOR A MOTOR CAR

BACKGROUND AND SUMMARY OF THE INVENTION

Exemplary embodiments of the invention relate to an electric drive train for a motor vehicle, in particular for a motor car.

U.S. Pat. No. 9,494,218 B2 discloses a power unit for driving two driven parts for driving a vehicle.

Exemplary embodiments of the present invention are directed to an electric drive train for a motor vehicle, so that a particularly advantageous drivability can be realized.

The invention relates to an electric drive train for a motor vehicle, also simply referred to as a vehicle. This means that the motor vehicle, preferably in the form of a motor car, in particular as a passenger car, in its completely produced state has the electric drive train and can be driven by means of the electric drive train. The electric drive train has a first electric engine which has a first rotor. For example, the first electric engine has a first stator, by means of which the first rotor can be driven and therefore in particular can be rotated around a first engine rotational axis, relative to the first stator. For example, the first electric engine can supply first drive torques via its first rotor to drive the motor vehicle. The electric drive train has a second electric engine having a second rotor. For example, the second electric engine has a second stator, by means of which the second rotor can be driven and therefore in particular can be rotated around a second engine rotational axis, relative to the second stator. It is conceivable the electric engines are arranged coaxially to each other, so the engine rotational axes coincide. The second electric engine can supply second drive torques via its second rotor to drive the motor vehicle. In particular, the motor vehicle can be driven electrically, in particular purely electrically, by means of the electric engines, so that the motor vehicle is preferably designed as an electric vehicle, in particular as a battery electric vehicle (BEV). The respective, electric engine is preferably designed as a high-voltage component, the electric voltage of which, in particular electric operating or rated voltage, is preferably greater than 50 volts, in particular greater than 60 volts, and more preferably is several hundred volts.

Furthermore, the electric drive train has a planetary gearbox, which has a first shaft, a second shaft, a third shaft, a fourth shaft, and a fifth shaft. For example, the electric drive train has a housing, with the planetary gearbox being arranged at least partially in the housing, for example. The first shaft, the second shaft, the third shaft, the fourth shaft, and the fifth shaft are five shafts of the planetary gearbox. Preferably, it is provided that the planetary gearbox has exactly five shafts, specifically the first shaft, the second shaft, the third shaft, the fourth shaft, and the fifth shaft. In particular, the respective shaft can be rotated around a shaft rotational axis relative to the housing. In particular, it is conceivable that the first electric engine and/or the second electric engine are arranged coaxially to the planetary gearbox, so that the first engine rotational axis and/or the second engine rotational axis coincide with the shaft rotational axis.

In particular, it is conceivable that the planetary gearbox has six gear elements. A first of the gear elements is a first sun gear, for example, a second of the gear elements is a first planetary carrier, for example, a third of the gear elements is a first ring gear, for example, a fourth of the gear elements is a second sun gear, for example, a fifth of the gear elements is a second planetary carrier, for example, and a sixth of the gear elements is a second ring gear, for example. The planetary gearbox has the at least or exactly six gear elements and the at least or exactly five shafts, in particular because, for example, two of the gear elements are connected to each other, in particular permanently, for conjoint rotation. In particular, for example, the first planetary carrier is connected permanently to the second planetary carrier for conjoint rotation. It is conceivable in this case that the gear elements connected to each other for conjoint rotation are designed to be separate from each other and are connected to each other, in particular permanently, for conjoint rotation, or the gear elements connected to each other for conjoint rotation are designed in one piece with each other, i.e., are formed from a single piece and thus are formed by a monobloc or are designed as a monobloc. The term monobloc is to be understood as a body produced in one piece, i.e., integrally, i.e., an integral body, meaning that, for example, the gear elements connected to each other for conjoint rotation are formed by the integrally produced body and thus are not assembled from parts designed separately from each other and connected to each other.

The electric drive train has a first vehicle wheel and a second vehicle wheel. The vehicle wheels are ground contact elements, by which the drive train and thus the motor vehicle as a whole is or can be supported downwards on ground, in the vehicle vertical direction of the motor vehicle. If the motor vehicle drives along the ground while the motor vehicle is supported downwards on the ground by the ground contact elements in the vehicle vertical direction, the vehicle wheels roll, in particular directly, on the ground. In particular, the vehicle wheels are components of the same motor vehicle axle, also referred to as the vehicle axle. For example, in its completely produced state, the motor vehicle has at least or exactly two vehicle axles arranged one behind the other in the vehicle longitudinal direction and thus following each other, specifically the aforementioned vehicle axle as a first vehicle axle and a second vehicle axle. The mentioned vehicle wheels are vehicle wheels of the first vehicle axle, for example. The first vehicle axle can have at least or exactly two vehicle wheels, specifically the first vehicle wheel and the second vehicle wheel. The second vehicle axle, for example, can have at least or exactly two other vehicle wheels, specifically a third vehicle wheel, and a fourth vehicle wheel, wherein the previous and following embodiments for the first vehicle wheel and for the second vehicle wheel can also be transferred simply to the third vehicle wheel and the fourth vehicle wheel. When the vehicle wheels are referred to in the following, unless otherwise stated, this means the first vehicle wheel and the second vehicle wheel. In particular, the electric engines can drive the vehicle wheels electrically, in particular purely electrically, wherein the motor vehicle can be driven electrically, in particular purely electrically. The vehicle wheels of the respective vehicle axle are arranged, for example, on opposite sides of the motor vehicle in the vehicle transverse direction of the vehicle.

With regard to a torque flow originating from the electric engines, i.e., in particular from the respective rotor, and running to the vehicle wheels, the electric engines are arranged upstream of the planetary gearbox in the torque flow, which is arranged upstream of the vehicle wheels in the torque flow, wherein the vehicle wheels can be driven by the electric engines via the planetary gearbox.

The electric drive train has a first switching element designed to couple the second rotor to the first shaft in such a way that the respective, second drive torque, which is or can be supplied by the second electric engine via the second rotor, can be introduced at the first shaft and in particular via the first shaft into the planetary gearbox. In other words, the second rotor can be connected, i.e., coupled, to the first shaft by means of the first switching element in a torque-trans- mitting manner, in particular for conjoint rotation. Expressed again in other words, the first switching unit is designed to couple the second rotor to the first shaft in such a way that torques originating from the second rotor can be introduced into the planetary gearbox at the first shaft.

Furthermore, the electric drive train comprises a second switching element, which is provided in particular in addi- tion to the first switching element. The second switching element is designed as a power shift switching element, in particular as a frictional coupling, in particular as a multi- plate clutch, wherein the frictional coupling is also referred to as a friction clutch. Therefore, friction elements of the power shift switching element can be designed to be both flat as well as conical, as is the case for example with classic synchronization.

The second switching element can also have a two-stage design. Here, two-stage means that the second switching element has a frictional fit in a first actuating stage and a form fit in a second actuating stage (as is the case with a known form-fitting switching element with synchroniza- tion). In the first actuating stage, a frictional fit can be created in order to carry out the power shift, while in the second actuating stage, a form fit is created in order to be able to transmit the torque via the second switching element, without using actuating energy. In an advantageous embodi- ment, the second switching element can be designed such that torque transmission can be ensured in the frictional actuating stage both with an engaged as well as with a disengaged coupling.

The second switching element is designed to connect the third shaft to a sixth shaft, in particular provided in addition to the five shafts of the planetary gearbox, for conjoint rotation. In other words, the third shaft can be connected to the sixth shaft by means of the second switching element for conjoint rotation. The sixth shaft is provided in addition to the five shafts of the planetary gearbox and, for example, is not a component of the planetary gearbox.

For example, the first switching element can be switched between a first coupled state and a first decoupled state. In the first coupled state, the second rotor is coupled to the first shaft by means of the first switching element, in particular in a torque-transmitting manner, in such a way that the respective, second drive torque, which can be supplied by the second electric engine via the second rotor, can be introduced into the planetary gearbox at the first shaft. In the first decoupled state, the second rotor and the first shaft are decoupled from each other, in such a way that torques cannot be transmitted between the second rotor and the first shaft via the first switching element. In particular, it is conceivable that in the first decoupled state, the second rotor and the first shaft can be rotated relative to each other around the shaft rotational axis or around the second engine rotational axis. For example, in the first coupled state, the second rotor and the first shaft are connected to each other by means of the first switching element. For example, the first switching element can be moved, in particular translationally and/or relative to the housing, between at least one first coupled position, which brings about the first coupled state, and at least one first decoupled position, which brings about the first decoupled state.

For example, the second switching element can be switched between a second coupled state and a second decoupled state. In the second coupled state, the third shaft is connected with a frictional fit or form fit to the sixth shaft by means of the second switching element for conjoint rotation. In the second decoupled state, the second switching element releases the third shaft for a rotation occurring around the shaft rotational axis relative to the sixth shaft, so that in the second decoupled state, the third shaft and the sixth shaft can be rotated around the shaft rotational axis relative to each other and so that torques cannot be trans- mitted between the third shaft and the sixth shaft in particu- lar via the second switching element. For example, the second switching element can be moved, in particular trans- lationally and/or relative to the housing, between at least one second coupled position, which brings about the second coupled state, and at least one second decoupled position, which brings about the second decoupled state.

In the context of the present disclosure, the feature that two components, such as, for example, the mentioned two gear elements, are connected to each other for conjoint rotation, is to be understood as meaning that the components connected to each other for conjoint rotation are arranged coaxially to each other and particularly when the compo- nents are driven, they rotate together or simultaneously around a rotational axis common to the components, such as for example the shaft rotational axis, at the same angular velocity, in particular relative to the housing. In other words, the term "for conjoint rotation" or "connected for conjoint rotation" can be understood to mean the following: Two elements are connected to each other for conjoint rotation when they are arranged coaxially to each other and are connected to each other in such a way that they rotate at the same angular velocity, in particular when they are driven. The feature that two components are connected to each other in a torque-transmitting manner means that the components are coupled or connected to each other in such a way that torques can be transmitted between the components, wherein if the components are connected to each other for conjoint rotation, the components are also connected to each other in a torque-transmitting manner.

The feature that two components are permanently con- nected to each other in a torque-transmitting manner means that instead of a switching element being provided which can be switched between a coupled state connecting the components to each other in a torque-transmitting manner and a decoupled state in which no torques can be transmitted between the components via the switching element, the components are constantly or always and thus permanently connected to each other in a torque-transmitting manner, i.e., in such a way that a torque can be transmitted between the components. This means, for example, that one of the components can be driven by the other component or vice versa. In particular, the feature that two components are permanently connected to each other for conjoint rotation means that instead of a switching element being provided which can be switched between a coupled state in which the components are connected to each other for conjoint rotation and a decoupled state in which the components are decoupled from each other and can be rotated relative to each other, so that torques cannot be transmitted between the components via the switching element, the components are constantly or always connected or coupled to each other, i.e., permanently for conjoint rotation.

The feature that two components, such as the second rotor and the first shaft, can be connected or coupled to each another for conjoint rotation or in a torque-transmitting manner means that a shift element, such as the first switch- ing element, is assigned to the components, which shift element can be switched between at least one coupled state and at least one decoupled state. In the coupled state, the components are connected to each other by means of the shift element for conjoint rotation or in a torque-transmitting manner. In the decoupled state, the components are decoupled from each other, so that in the decoupled state the components can be rotated relative to each other, in particular around the component rotational axis, such as for example the shaft rotational axis, and in particular so that torques cannot be transmitted between the components via the shift element.

For example, the sixth shaft can be rotated around an element rotational axis relative to the housing. Preferably, the sixth shaft is arranged coaxially to the mentioned five shafts of the planetary gearbox so that the element rotational axis coincides with the shaft rotational axis.

In order to be able to realize particularly advantageous drivability of the electric drive train and thus of the motor vehicle overall, it is provided according to the invention that the electric drive train has a third switching element, in particular provided in addition to the first switching element and in addition to the second switching element, which is designed as a form-fitting coupling, in particular a claw coupling. The third switching element is designed to connect the second shaft or the fourth shaft to the sixth shaft for conjoint rotation. In other words, the sixth shaft can be connected in a form-fitting manner to the second shaft or in a form-fitting manner to the fourth shaft by means of the third switching element. The second shaft and the fourth shaft are also referred to collectively as coupling shafts. The third switching element can be switched between a third coupled state and a third decoupled state, for example. In the third coupled state, the sixth shaft is connected by means of the third switching element to the coupling shaft, i.e., to one, in particular exactly one, of the coupling shafts for conjoint rotation. In the third decoupled state, the third switching element releases the sixth shaft for a rotation occurring around the element rotational axis or the shaft rotational axis and relative to the one coupling shaft, so that in the third decoupled state, the one coupling shaft and the sixth shaft can be rotated relative to each other around the element rotational axis or around the shaft rotational axis. In particular, for example, the third switching element can be moved, in particular translationally and/or relative to the housing, between at least one third coupled position, which brings about the third coupled state, and at least one third decoupled position, which brings about the third decoupled state.

According to the invention, the electric drive train also has a first transmission stage which, with regard to the torque flow, is arranged downstream of the planetary gearbox and upstream of the first vehicle wheel in the torque flow, so that the first vehicle wheel can be driven by the planetary gearbox via the first transmission stage. In this case, the fourth shaft is or can be coupled to the first vehicle wheel via the first transmission stage, in particular in a torque-transmitting manner, so that the first vehicle wheel can be driven by the fourth shaft via the first transmission stage.

A second transmission stage is also provided, in particular in addition to the first transmission stage, which, with regard to the torque flow, is arranged downstream of the planetary gearbox and upstream of the second vehicle wheel, so that the second vehicle wheel can be driven by the planetary gearbox via the second transmission stage. The fifth shaft is or can be coupled to the second vehicle wheel via the second transmission stage, in particular in a torque-transmitting manner, so that the second vehicle wheel can be driven by the fifth shaft via the second transmission stage.

The first transmission stage has a first transmission ratio, in particular viewed from the fourth shaft to the first vehicle wheel. The second transmission stage has a second transmission ratio, in particular viewed from the fifth shaft to the second vehicle. In this case, it is provided that the first transmission ratio is different from the second transmission ratio. In other words, the first transmission ratio differs from the second transmission ratio. In particular, the absolute value of the first transmission ratio is dissimilar to the absolute value of the second transmission ratio.

Expressed in other words, with regard to the torque flow originating from the electric engines, the electric engines are arranged upstream, i.e., upstream of the planetary gearbox, and the planetary gearbox is arranged upstream, i.e., upstream of the vehicle wheels, with regard to the torque flow.

The first transmission stage, with regard to the torque flow, is arranged between the planetary gearbox and the first vehicle wheel, and the second transmission stage, with regard to the torque flow, is arranged between the planetary gearbox and the second vehicle wheel.

Power shift capability of the electric drive train can be realized by the invention, so that both particularly good driving dynamics as well as particularly high level of driving comfort can be realized. The first transmission ratio is also labelled with i1, and the second transmission ratio is also labelled with i2. The fact that the third switching element is designed as a form-fitting coupling means that losses can be kept particularly low, so that so that a particularly efficient operation can be achieved. If the first transmission ratio and the second transmission ratio, in particular the absolute values thereof, were identical, it would be difficult or not possible, for example, to switch between two different operating modes of the electric drive train without interrupting the traction, because the third switching element, designed as a claw switching element, for example, would have to be opened, in particular at one end of a switching process for switching from a first of the operating modes into a second of the operating modes. A form-fitting switching element, such as a claw switching element, can or is to be opened, i.e., switched from its coupled state into its decoupled state, only when a load-free state exists between coupling halves of the claw switching element, i.e., between elements, which can be connected to each other by means of the claw switching element for conjoint rotation. This load-free state could be created by, for example, the second switching element, formed as a frictional coupling, being operated with slippage, but only when there is a differential speed, in particular on the second switching element, when driving straight ahead, i.e., when there is a differential speed between an input of the second switching element and an output of the second switching element and when, during the switching, the coupling half of the switching element, placed downstream in the torque flow, has a lower speed than the coupling half placed upstream. If the speeds were the same, the second switching element would then not even be engaged in the first place if it were to be designed as a form-fitting switching element. A tooth-to-tooth position can only be triggered via relative speeds between the input and the output. When driving straight ahead, there is however not usually the mentioned differential speed, in particular since the vehicle wheels rotate at the same speed in the same direction of rotation when driving straight ahead. However, since the planetary gearbox, also referred to as a coupling gear or functioning as a coupling gear, has an unsymmetrical design in the invention, the mentioned differential speed occurs at the second switching element when the motor vehicle is driving straight ahead, in particular between the input and the output of the second switching element, whereby a power shift capability can be realized, in particular in such a way that the third switching element can be switched, in particular opened, without load and thus with interruption of traction, while the vehicle wheels are driven by means of at least one of the electric engines or by means of both electric engines, wherein the torque is transmitted via the first switching element and the slipping second switching element. The unsymmetrical design of the planetary gearbox is thus balanced out by an unsymmetrical design of the two transmission stages. The unsymmetrical design of the transmission stages is therefore realized in that the first transmission stage and the second transmission stage, in particular their absolute values, differ from each other. In particular, it is conceivable that the second transmission ratio, in particular the absolute value of the second transmission ratio, is greater than the first transmission ratio, in particular the absolute value of the first transmission ratio.

The transmission ratios of the two planetary stages and of the two transmission stages are in proportion to each other such that in the first operating mode, a classic differential operation of the two driven wheels takes place in an ideal manner with a 50:50 torque distribution and that a corresponding speed balance can take place at the wheels when cornering.

In particular, it is therefore possible to switch, for example, from the aforementioned first operating mode into the aforementioned second operating mode free of traction interruption, i.e., without interruption of traction.

In a particularly advantageous embodiment of the invention, the planetary gearbox has a first planetary gear set and a second planetary gear set. For example, the first planetary gear set comprises the first sun gear, the first planetary carrier, and the first ring gear. For example, the second planetary gear set comprises the second sun gear, the second planetary carrier, and the second ring gear. It is preferably provided that the first planetary carrier of the first planetary gear set and the second planetary carrier of the second planetary gear set are connected to each other, in particular permanently, for conjoint rotation and form a common planetary carrier, which is also referred to as the entire planetary carrier. It is conceivable here that the first planetary carrier and the second planetary carrier are designed to be separate from each other and are connected to each other, in particular permanently, for conjoint rotation, or the first planetary carrier and the second planetary carrier are designed as one piece, i.e., formed from a single piece. In this case, it is provided that one of the five shafts of the planetary gearbox has the common planetary carrier, i.e., the entire planetary carrier. In other words, the one of the five shafts comprises the common planetary carrier. Expressed again in other words, the common planetary carrier forms the one of the five shafts, for example, so that the common planetary carrier is a component of the one of the five shafts of the planetary gearbox. In particular, it is thus conceivable that the respective shaft has a respective shaft section and at least or exactly one of the gear elements, in particular exactly two of the gear elements, wherein the respective shaft section of the respective shaft and the respective gear element of the respective shaft are connected to each other for conjoint rotation, in particular are connected permanently to each other for conjoint rotation. In the aforementioned embodiment, it is thus conceivable that the one of the five shafts comprises a shaft section and the common planetary carrier, i.e., the first planetary carrier and the second planetary carrier, wherein the shaft section of the one of the five shafts is connected, in particular permanently, to the entire planetary carrier for conjoint rotation. As a result, a particularly advantageous drivability can be achieved.

The unsymmetrical design of the planetary gearbox can be explained in the sense that transmission ratios are selected inside the first planetary gear set and inside the second planetary gear set in such a way that for torques originating from the first electric engine, the same torque results in each case via a first torque transmission path at the first vehicle wheel as via a second torque transmission path at the second vehicle wheel.

Therefore, the mentioned shafts of the planetary gearbox are arranged in such a way that the first torque transmission path runs from the first electric engine, continues via the sixth shaft, continues via the second shaft, continues via the fourth shaft, and continues via the first transmission stage up to the first vehicle wheel, and that the second torque transmission path runs from the first electric engine, continues via the sixth shaft, continues via the second shaft, continues via the fifth shaft, and continues via the second transmission stage up to the second vehicle wheel.

A further embodiment is characterized in that the first shaft has one of the sun gears of the planetary gearbox, wherein the third shaft has another of the sun gears of the planetary gearbox or one of the ring gears of the planetary gearbox. Therefore, a particularly advantageous switchability and thus a particularly advantageous drivability can be realized.

In a further, particularly advantageous embodiment of the invention, it is provided that the sixth shaft is or can be coupled to the first rotor, in particular in a torque-transmitting manner and specifically for conjoint rotation, and, with regard to the torque flow, is arranged between the first rotor and the planetary gearbox, in particular upstream of the planetary gearbox and downstream of the first rotor, in the torque flow. As a result, a particularly advantageous drivability can be achieved in a particularly space-efficient manner.

A further embodiment is characterized in that the first shaft has or comprises the first sun gear. The third shaft has the second sun gear, wherein the second shaft has or comprises the common planetary carrier. The fifth shaft has, for example, the first ring gear, and the fourth shaft has the second ring gear. Therefore, particularly advantageous transmission ratios can be realized in a particularly space-efficient manner, wherein a particularly advantageous drivability can be achieved.

In a further, particularly advantageous embodiment of the invention, it is provided that first planetary gears, second planetary gears, and third planetary gears of the planetary gearbox can be rotatably mounted on the common planetary carrier. The first planetary gears mesh with the first sun gear and with the second planetary gears, and the second planetary gears mesh with the first ring gear and with the second sun gear. The third planetary gears mesh with the second planetary gears and with the second ring gear. Therefore, a particularly advantageous transmission ratio and thus a particularly advantageous drivability can be realized.

In order to be able to achieve a particularly advantageous drivability in a particularly space-efficient manner, it is provided in a further embodiment of the invention that the sixth shaft is connected, in particular permanently, to the first rotor for conjoint rotation.

In a further, particularly advantageous embodiment of the invention, it is provided that the sixth shaft is connected to a first input shaft of the first transmission stage, in particular permanently, for conjoint rotation and, with regard to the torque flow, is arranged downstream of the planetary gearbox and in particular upstream of the first transmission stage in the torque flow. Therefore, a particularly advantageous transmission ratio and thus a particularly advantageous drivability can be realized in a space-efficient manner.

A further embodiment is characterized in that the first shaft has the first sun gear of the planetary gearbox, wherein the second shaft has the first ring gear of the planetary gearbox. The third shaft has the second ring gear of the planetary gearbox, and the fourth shaft has the second sun gear of the planetary gearbox. In this case, the fifth shaft has the common planetary carrier. Therefore, a particularly advantageous transmission ratio and thus a particularly advantageous drivability can be realized in a particularly space-efficient manner.

Lastly, it has been shown to be particularly advantageous for realizing a particularly advantageous drivability when first planetary gears, second planetary gears and third planetary gears are rotatably mounted on the common planetary carrier, wherein the first planetary gears mesh with the first sun gear and with the first ring gear, wherein the second planetary gears mesh with the second sun gear and with the first planetary gear, and wherein the third planetary gears mesh with the second planetary gears and with the second ring gear.

In the context of the present disclosure, the terms "axial" and "axial direction" refer to the shaft rotational axis of the planetary gearbox, also referred to as a rotational axis. Advantageously, the planetary gear sets are arranged coaxially to each other. Advantageously, the electric engines and the transmission stages are arranged coaxially to the planetary gearbox and thus to the shaft rotational axis.

It is conceivable that the respective transmission stage is designed as a respective, further planetary gear set, provided in addition to the planetary gearbox, whereby a particularly advantageous transmission ratio and thus a particularly good drivability can be realized in a particularly space-efficient manner.

Further advantages, features and details of the invention result from the following description of preferred exemplary embodiments and using the drawing. The features and combinations of features mentioned above in the description, as well as the features and combinations of features mentioned below in the description of the figures and/or shown in the figures alone, can be used not only in the combination indicated in each case, but also in other combinations or on their own, without leaving the scope of the invention.

BRIEF DESCRIPTION OF THE DRAWING FIGURES

Figure 2:
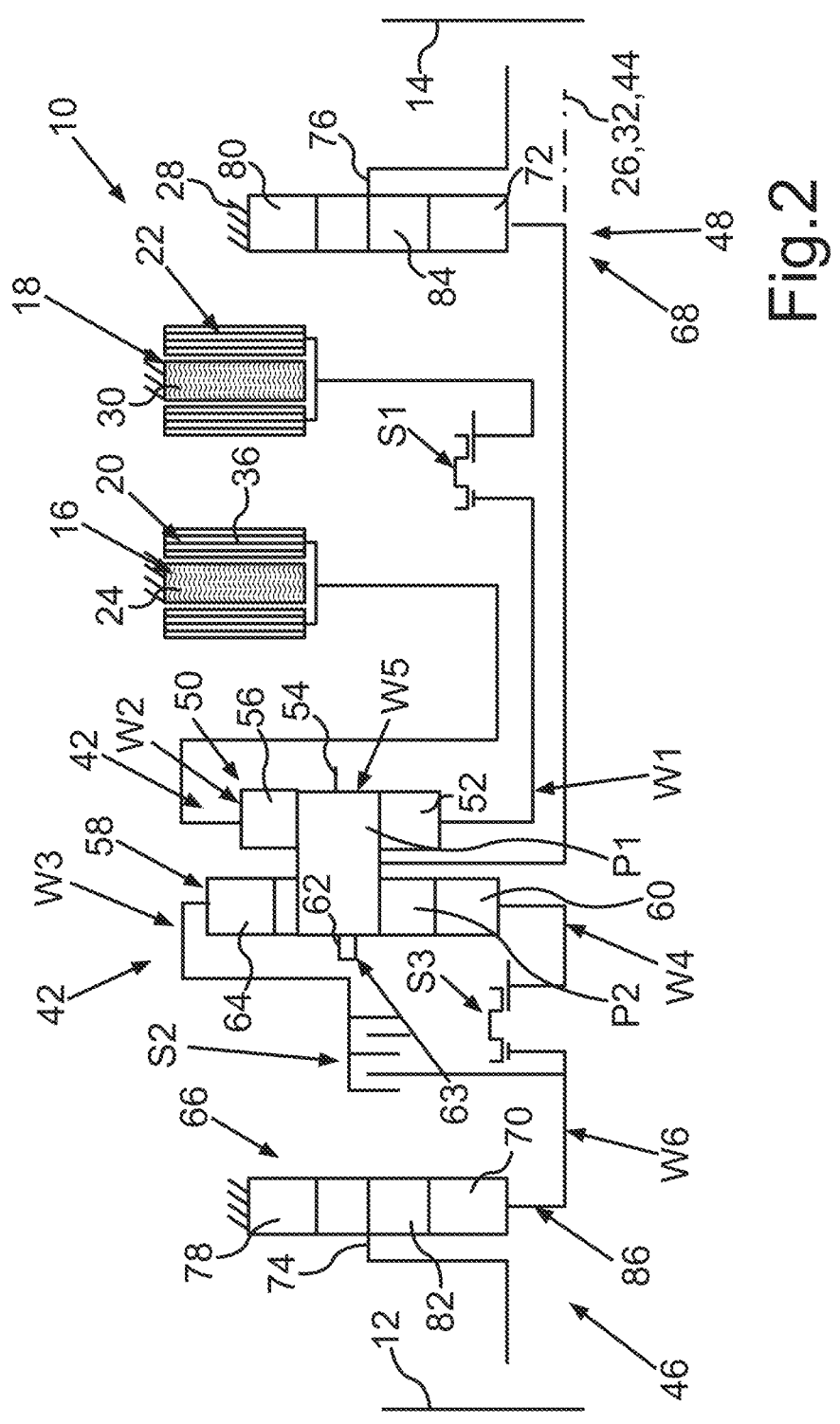
Figure 3:
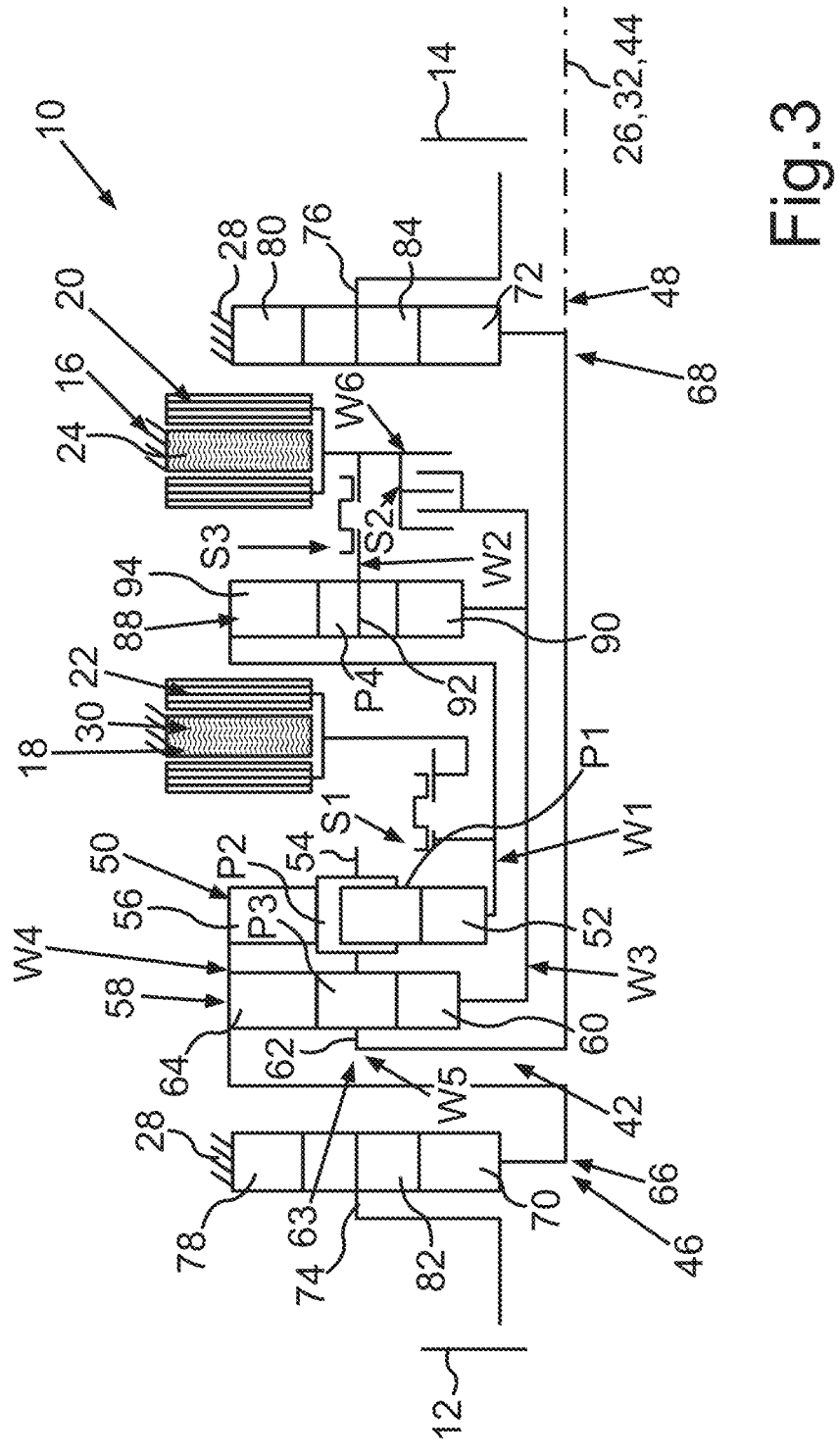

The drawing shows in:

FIG. 1 a schematic representation of a first embodiment of an electric drive train for a motor vehicle;

FIG. 2 a schematic representation of a second embodiment of the electric drive train; and FIG. 3 a schematic representation of a third embodiment of the electric drive train.

In the figures, identical or functionally identical elements are provided with the same reference signs.

DETAILED DESCRIPTION

FIG. 1 shows a schematic perspective view of a first embodiment of an electric drive train 10 for a motor vehicle, also simply referred to as a vehicle. This means that in its completely produced state, the motor vehicle has the electric drive train 10 and can be driven by means of the electric drive train 10. In its completely produced state, the motor vehicle, preferably formed as a motor vehicle, in particular as a passenger car, has at least or exactly two vehicle axles, also simply referred to as axles, arranged one behind the other and thus successively in the vehicle longitudinal direction. The respective vehicle axle has at least or exactly two vehicle wheels, also simply referred to as wheels. The respective vehicle wheels of the respective vehicle axle are arranged on opposite sides of the motor vehicle in the vehicle transverse direction of the vehicle. Therefore, the electric drive train 10 comprises at least or exactly one of the vehicle axles and thus the at least or exactly two vehicle wheels of the at least or exactly one vehicle axle of the electric drive train 10. The vehicle wheels of the drive train 10 are represented particularly schematically in FIG. 1 and referenced with 12 and 14. The vehicle wheel 12 is also referred to as a first vehicle wheel and the vehicle wheel 14 is also referred to as a second vehicle wheel. The vehicle wheels of the motor vehicle are ground contact elements, by which the motor vehicle is or can be supported downwards on ground, in the vehicle vertical direction of the vehicle. If the motor vehicle drives along the ground whilst the motor vehicle is supported downwards on the ground by the ground contact elements in the vehicle vertical direction, the vehicle wheels of the motor vehicle roll, in particular directly, on the ground.

The electric drive train 10 comprises a first electric engine 16 and a second electric engine 18, wherein the vehicle wheels 12 and 14 can be driven electrically, in particular purely electrically, by means of the electric engines 16 and 18. Therefore, the motor vehicle can be driven electrically, in particular purely electrically.

The first electric engine 16 has a first rotor 20 by which the first electric engine 16 can provide first drive torques to drive the vehicle wheels 12 and 14. The second electric engine 18 has a second rotor 22 by which the second electric engine 18 can provide second drive torques to drive the vehicle wheels 12 and 14.

The first electric engine 16 has a first stator 24, by means of which the first rotor 20 can be driven and can thus be rotated about a first engine rotational axis 26 relative to the first stator 24 and also relative to a housing 28 of the electric drive train 10, particularly schematically represented in FIG. 1. The second electric engine 18 has a second stator 30, by means of which the second rotor 22 can be driven and can thus be rotated about a second engine rotational axis 32 relative to the stator 30 and also relative to the housing 28. In the first embodiment shown in FIG. 1, the electric engines 16 and 18 are arranged coaxially to one another so that the engine rotational axes 26 and 32 coincide.

It can also be seen from FIG. 1 that the respective electric engine 16, 18 is designed as an axial flow machine. In this case, the respective rotor 20, 22 has two rotor elements 34 and 36 or respectively 38 and 40, for example designed as rotor discs. The respective rotor elements 34 and 36 or respectively 38 and 40 of the respective electric engine 16, 18 are spaced apart from each other in the axial direction of the respective electric engine 16, 18 and thus viewed along the respective engine rotational axis 26, 32. In this case, a respective partial region of the respective stator 24, 30 of the respective electric engine 16, 18 is arranged between the respective rotor elements 34 and 36 or respectively 38 and 40 in the axial direction of the respective electric engine 16, 18, in such a way that the respective rotor element 34, 36, 38, 40 of the respective electric engine 16, 18 is overlapped or covered at least partially by the respective partial region of the respective stator 24, 30 of the respective electric engine 16, 18, in a direction extending in the axial direction of the respective electric engine 16, 18 and pointing towards the respective other rotor element 36, 34, 40, 38.

The electric drive train 10 has a planetary gearbox 42, which has in particular at least or exactly five shafts, specifically a first shaft W1, a second shaft W2, a third shaft W3, a fourth shaft W4, and a fifth shaft W5. The respective shaft W1, W2, W3, W4, W5 can be rotated around a respective shaft rotational axis 44 relative to the housing 28. In the first embodiment, the planetary gearbox 42 is arranged coaxially to the respective electric engine 16, 18 so that the shaft rotational axis 44 coincides with the engine rotational axis 26 and with the engine rotational axis 32. In particular, the planetary gearbox 42 is arranged at least partially in the housing 28.

With regard to a torque flow originating from the electric engines 16 and 18 and running to the vehicle wheels 12 and 14, along which torque flow, for example, the respective drive torque can be or is transmitted from the respective electric engine 16, 18 to the respective vehicle wheel 12, 14 in order to thereby drive the respective vehicle wheel 12, 14, the electric engines 16 and 18 are arranged upstream of the planetary gearbox 42 arranged in the torque flow, in the torque flow, so that the vehicle wheels 12 and 14 can be driven by the electric engines 16, 18, in particular by the rotors 20 and 22, via the planetary gearbox 42.

The electric drive train 10 has a first switching element S1 that is designed to couple the second rotor 22 to the first shaft W1, in particular in a torque-transmitting manner and specifically for conjoint rotation, in such a way that the respective, second drive torque, which can be or is supplied by the second electric engine 18 via the second rotor 22, can be introduced at the first shaft W1 and via the first shaft W1 into the planetary gearbox 42.

Furthermore, the electric drive train 10 has a second switching element S2, which is formed as a power shift coupling, in particular a frictional coupling, in particular as a multi-plate clutch or multi-plate brake. The second switching element S2 can have a two-stage design, having a friction-fitting part, e.g. having a cone coupling as a synchronizing element, and a form-fitting part, for example a claw coupling as a form-fitting element.

The second switching element S2 is designed to connect the third shaft W3 with a friction fit or force fit during a module change between a first operating mode and a second operating mode to a sixth shaft W6, provided in addition to the five shafts W1, W2, W3, W4, W5 of the planetary gearbox 42, in particular in a torque-transmitting manner and in particular at the end of the switching process, for conjoint rotation. In the first embodiment shown in FIG. 1, the sixth shaft W6 is connected, in particular permanently, to the first rotor 20 for conjoint rotation, so that, for example, the respective first drive torque, which can be or is supplied by the first electric engine 16 via the first rotor 20, can be introduced at the third shaft W3 and via the third shaft W3 into the planetary gearbox 42.

The electric drive train 10 further comprises a third switching element S3, which is designed as a form-fitting coupling, in particular as a claw coupling or claw switching element. In the first embodiment, the third switching element S3 is designed to connect the second shaft W2 to the sixth shaft W6 in a form-fitting manner and for conjoint rotation.

Furthermore, the electric drive train 10 has a first transmission stage 46 which, with regard to the torque flow, is arranged downstream of the planetary gearbox 42 and upstream of the first vehicle wheel 12 in the torque flow, wherein the fourth shaft W4 is coupled to the first vehicle wheel 12 via the first transmission stage 46, in particular in a torque-transmitting manner and specifically permanently in a torque-transmitting manner. Thus, the first vehicle wheel 12 can be driven by the fourth shaft W4 via the first transmission stage 46.

Furthermore, the electric drive train 10 comprises a second transmission stage 48 which, with regard to the torque flow, is arranged upstream of the vehicle wheel 14 and downstream of the planetary gearbox 42 in the torque flow. Therefore, the second vehicle wheel 14 can be driven by the planetary gearbox 42 via the second transmission stage 48. The fifth shaft W5 is coupled to the second vehicle wheel 14 via the second transmission stage 48, in particular in a torque-transmitting manner and specifically permanently in a torque-transmitting manner, so that the second vehicle wheel 14 can be driven by the fifth shaft W5 via the second transmission stage 48. The first transmission stage 46 has a first transmission ratio, in particular having a first absolute value. The second transmission stage 48 has a second transmission ratio, in particular having a second absolute value. In this case, the transmission ratios, in particular the absolute values of the transmission ratios, are dissimilar so that, for example, the second transmission ratio, in particular the absolute value of the second transmission ratio, is greater or smaller than the first transmission ratio, in particular the absolute value of the first transmission ratio. The planetary gearbox 42 forms or is a coupling gear or is also referred to as a coupling gear. For example, the switching elements S2 and S3 form a changeover device, since an advantageous switchability or shiftability of the electric drive train 10, in particular between at least two operating modes, the first operating mode and the second operating mode, can be realized by means of the switching elements S2 and S3.

The planetary gearbox 42 has a first planetary gear set 50, having a first sun gear 52, a first planetary carrier 54, and a first ring gear 56. Furthermore, the planetary gearbox 42 has a second planetary gear set 58 having a second sun gear 60, a second planetary carrier 62, and a second ring gear 64. The planetary carriers 54 and 62 are also referred to as bridges, wherein the planetary carrier 54 is also referred to as a first bridge and the planetary carrier 62 is also referred to as a second bridge. In the first embodiment, the planetary carriers 54 and 62 are connected to each other for conjoint rotation, for example in such a way that the planetary carriers 54 and 62 are designed to be separate from each other and are connected to each other for conjoint rotation, or for example in such a way that the planetary carriers 54 and 62 are integrally designed, i.e., are formed from a single piece. In particular, the planetary carriers 54 and 62 are connected to each other permanently for conjoint rotation. As a result, the planetary carriers 54 and 62 form a common planetary carrier 63, which is also referred to as an entire planetary carrier. Therefore, the entire planetary carrier forms one of the five shafts W1, W2, W3, W4, and W5 of the planetary gearbox 42. In other words, one of the five shafts W1, W2, W3, W4, and W5 of the planetary gearbox 42 has the entire planetary carrier. In the first embodiment shown in FIG. 1, the one of the five shafts W1, W2, W3, W4, and W5 of the planetary gearbox 42 is the second shaft W2, meaning that in the first embodiment, the second shaft W2 has the entire planetary carrier. In other words, in the first embodiment, the entire planetary carrier forms the second shaft W2. This means that the entire planetary carrier is a component of the second shaft W2 in the first embodiment.

For example, the respective shaft W1, W2, W3, W4, W5 of the planetary gearbox 42 has a respective shaft section by means of which, for example, the respective shaft W1, W2, W3, W4, W5 of the planetary gearbox 42 is mounted rotatably at least indirectly on the housing 28. Furthermore, the respective shaft W1, W2, W3, W4, W5 of the planetary gearbox 42 has, for example, a respective element section provided, in particular, in addition to the respective shaft section and is formed or functions as a respective gear element of the planetary gearbox 42, in particular of the respective planetary gear set 50, 58. In the first embodiment, with regard to the second shaft W2, the element section of the second shaft W2 is a planetary carrier section, which has or forms the entire planetary carrier or is formed by the entire planetary carrier. The planetary carrier section is explained in more detail in the following. In other words, the planetary carrier section of the shaft W2 is formed by the planetary carrier 54 and 62 or comprises the planetary carrier 54 and 62. The sun gears 52 and 60, the planetary carriers 54 and 62, and the ring gears 56 and 64 are gear elements of the planetary gearbox 42, in particular of the respective planetary gear set 50, 58. The respective gear element can be rotated around the shaft rotational axis 44 relative to the housing 28.

Since two, in particular exactly two, of the six gear elements of the planetary gearbox 42, in this case the planetary carriers 54 and 62, are connected to each other for conjoint rotation, in particular permanently for conjoint rotation, the six gear elements of the planetary gearbox 42 form the five shafts W1, W2, W3, W4, and W5 of the planetary gearbox 42. In particular, it can be provided that the five shafts W1, W2, W3, W4 and W5 of the planetary gearbox 42 can be rotated in pairs around the shaft rotational axis 44 relative to each other.

In the first embodiment, the first shaft W1 has the first sun gear 52, so that in the first embodiment, the element section of the first shaft W1 has the sun gear 52 or is formed by the sun gear 52. In the first embodiment, the third shaft W3 has the second sun gear 60, so that the element section of the third shaft W3 has the second sun gear 60 or is formed by second the sun gear 60. In the first embodiment, the sixth shaft W6 is connected and thus coupled to the first rotor 20, in particular permanently, for conjoint rotation, wherein the sixth shaft W6, with regard to the torque flow, is arranged between the first rotor 20 and the planetary gearbox 42, in particular downstream of the first rotor 20 and upstream of the planetary gearbox 42, in the torque flow, so that the planetary gearbox 42 can be driven by the first rotor 20 via the sixth shaft W6. In the first embodiment, the fifth shaft W5 has the first ring gear 56, so that the element section of the fifth shaft W5 has the ring gear 56 or is formed by the ring gear 56. In the first embodiment, the fourth shaft W4 has the ring gear 64, so that the element section of the fourth shaft W4 is formed by the second ring gear 64 or has the second ring gear 64.

In the first embodiment, the planetary gearbox 42 has first planetary gears P1, second planetary gears P2, and third planetary gears P3. The planetary gears P1, P2, and P3 can be rotatably mounted on the entire planetary carrier. In the first embodiment, it is provided that the element section of the shaft W2 has the entire planetary carrier or is formed by the entire planetary carrier, wherein the planetary gears P1, P2, and P3 are rotatably mounted on the entire planetary carrier, i.e., on the element section of the second shaft W2. The first planetary gears P1 mesh with the first sun gear 52 and with the second planetary gears P2, in particular with the first toothing sections of the second planetary gears P2. The second planetary gears P2 mesh with the first ring gear 56 and with the second sun gear 60, in particular in such a way that the respective first toothing sections of the second planetary gears P2 mesh with the ring gear 56 and respective second toothing sections of the planetary gears P2 mesh with the sun gear 60.

It is in particular conceivable that the respective first toothing section and the respective second toothing section of the respective second planetary gear P2 are arranged successively, i.e., one behind the other, in the axial direction of the respective second planetary gear P2. For example, the respective first toothing section of the respective second planetary gear P2 is formed by a respective first toothing of the respective second planetary gear P2, with, for example, the respective second toothing section of the respective second planetary gear P2 being formed by a respective second toothing of the respective second planetary gear P2. The third planetary gears P3 mesh with the second ring gear 64 and with the second planetary gears P2, in particular with the second toothing sections of the second planetary gears P2. Preferably, the first toothing has a first rolling circle diameter and a first pitch circle diameter. The second toothing has a second rolling circle diameter and a second pitch circle diameter. Preferably, the first pitch circle diameter and the second pitch circle diameter differ from each other. Alternatively or additionally, the first rolling circle diameter and the second rolling circle diameter differ from each other.

In the first embodiment, for example, the second pitch circle diameter or the second rolling circle diameter is greater than the first pitch circle diameter or than the first rolling circle diameter. Thus, the respective second planetary gear P2 is designed as a staged planetary gear, which is also referred to as a staged planet. In particular, the first toothing and the second toothing are connected to each other, in particular permanently, for conjoint rotation. For example, the first toothing and the second toothing are integrally designed, i.e., are formed from a single piece. Overall, it can be seen that in the first embodiment, the planetary gears P1 mesh with the first sun gear 52 and with the second planetary gears P2, in particular with the first toothing sections of the second planetary gears P2, and the planetary gears P1 do not mesh with the first ring gear 56, the second ring gear 64, the second sun gear 60 and the third planetary gears P3. The second planetary gears P2, in particular the second toothing sections, mesh with the third planetary gears P3, and the second planetary gears P2, in particular the second toothing sections, mesh with the second sun gear 60. The second planetary gears P2, in particular the first toothing sections, mesh with the first ring gear 56, and the second planetary gears P2, in particular the first toothing sections, mesh with the first planetary gears P1. The second planetary gears P2 do not mesh with the first sun gear 52 and the second ring gear 64. The third planetary gears P3 mesh with the second planetary gears P2, in particular with the second toothing sections, and the third planetary gears P3 mesh with the second ring gear 64. The third planetary gears P3 do not mesh with the first sun gear 52, the first ring gear 56, the second sun gear 60 and the first planetary gears P1. Furthermore, in the first embodiment it is provided that the sixth shaft W6 is connected to the first rotor 20, in particular permanently, for conjoint rotation.

The respective transmission stage 46, 48 is designed as a respective further planetary gear set 66, 68, provided in addition to the planetary gearbox 42 and thus to the planetary gear sets 50 and 58. The respective further planetary gear set 66, 68 has a respective further sun gear 70, 72, a respective further planetary carrier 74, 76 and a respective further ring gear 78, 80. In the first embodiment, the respective sun gear 70, 72 is designed as a respective input of the respective transmission stage 46, 48 in such a way that the sun gear 70 is or can be connected to the fourth shaft W4 in a torque-transmitting manner, in particular for conjoint rotation, and in such a way that the sun gear 72 is or can be connected to the fifth shaft W5 in a torque-transmitting manner, in particular for conjoint rotation.

In the first embodiment, the sun gear 70 is connected to the fourth shaft W4 permanently in a torque-transmitting manner, in particular permanently for conjoint rotation, and in the first embodiment, the sun gear 72 is connected to the fifth shaft W5 permanently in a torque-transmitting manner, in particular permanently for conjoint rotation. The respective planetary carrier 74, 78 is a respective output of the respective transmission stage 46, 48, in this case in such a way that the vehicle wheel 12 can be driven by the planetary carrier 74 and the vehicle wheel 14 can be driven by the planetary carrier 76. In particular, the vehicle wheel 12 can be or is connected to the planetary carrier 74 in a torque-transmitting manner, in particular permanently in a torque-transmitting manner, and the vehicle wheel 14 is or can be connected to the planetary carrier 76 in particular permanently in a torque-transmitting manner The respective ring gear 78, 80 can be or is connected to the housing 28 for conjoint rotation. In the first embodiment, the respective ring gear 78, 80 is connected to the housing 28 permanently for conjoint rotation. The respective further planetary gear set 66, 68 has respective further planetary gears 82, 84, wherein the planetary gears 82 are rotatably mounted on the planetary carrier 74 and the planetary gears 84 are rotatably mounted on the planetary carrier 76. The planetary gears 82 mesh simultaneously with the sun gear 70 and with the ring gear 78 and the planetary gears 84 mesh simultaneously with the sun gear 72 and with the ring gear 80.

FIG. 2 shows a second embodiment of the electric drive train 10, in a schematic representation. In the second embodiment, the sixth shaft W6 is connected to a first input shaft 86 of the first transmission stage 46, in particular permanently, for conjoint rotation, wherein it is conceivable that the sixth shaft W6 and the first input shaft 86 are integrally designed, i.e., are formed from a single piece. The first input shaft 86 has the sun gear 70, so that the sun gear 70 is or forms an element section of the input shaft 86. For example, the first input shaft 86 is rotatably mounted at least indirectly on the housing 28 via its shaft section. The sixth shaft W6 is arranged, with regard to the torque flow, downstream of the planetary gearbox 42 and upstream of the sun gear 70 or of the first input shaft 86 in the torque flow. In the second embodiment, the first shaft W1 has the first sun gear 52, and the second shaft W2 has the first ring gear 56. Thus, in the second embodiment, the element section of the first shaft W1 is formed by the sun gear 52, and the element section of the shaft W2 is formed by the ring gear 56. The third shaft W3 has the second ring gear 64 and the fourth shaft W4 has the second sun gear 60. In the second embodiment, the fifth shaft W5 has the common planetary carrier 63 (entire planetary carrier).

In the second embodiment, the planetary gears P1 and P2 are mounted rotatably on the entire planetary carrier. In the second embodiment, there are no third planetary gears. Therefore, it is provided that the first planetary gears P1, in particular the respective first toothing sections of the first planetary gears P1, mesh with the first sun gear 52 and with the first ring gear 56. The second planetary gears P2 mesh with the second sun gear 60 and with the first planetary gears P1, in particular with the respective second toothing sections of the first planetary gears P1 and with the second ring gear 64. Overall, it can be seen that the first planetary gears P1, in particular the first toothing sections of the first planetary gears P1, mesh with the first sun gear 52 and with the first ring gear 56, and the first planetary gears P1, in particular the second toothing sections of the planetary gears P1, mesh with the second planetary gears P2. In particular, it is conceivable that the first toothing section and the second toothing section or the first toothing and the second toothing have the same rolling circle diameter or pitch circle diameter, so that, for example, the first rolling circle diameter and the second rolling circle diameter or the first pitch circle diameter and the second pitch circle diameter are the same in the second embodiment. The second planetary gears P2 mesh with the second sun gear 60, the second ring gear 64 and with the first planetary gears P1, in particular with the second toothing sections of the first planetary gears P1.

The second planetary gears P2 do not mesh with the first sun gear 52 or the first ring gear 56.

In the third embodiment, the sixth shaft W6 is coupled, i.e., connected to the first rotor 20, in particular permanently, in a torque-transmitting manner, in particular for conjoint rotation, and with regard to the torque flow, is arranged between the first rotor 20 and the planetary gearbox 42 in the torque flow.

In the third embodiment, the planetary gearbox 42 has at least or exactly three planetary gear sets, specifically the first planetary gear set 50, the second planetary gear set 58 and a third planetary gear set 88, which is provided in addition to the planetary gear sets 50 and 58 and also in addition to the transmission stages 46 and 48. The third planetary gear set 88 has a third sun gear 90, a third planetary carrier 92, also referred to as a third bridge, and a third ring gear 94. Thus, the planetary gearbox 42 has nine, in particular at least or exactly nine, gear elements, specifically the sun gears 52, 60 and 90, the planetary carriers 54, 62 and 92, and the ring gears 56, 64 and 94.

Also, in the third embodiment, the planetary gearbox 42 has in particular at least or exactly five shafts, specifically the shafts W1, W2, W3, W4 and W5. First, this is realized in that, in the third embodiment, the planetary carriers 54 and 62 are connected to each other, in particular permanently, for conjoint rotation and as a result in the third embodiment form the shaft W5. Accordingly, the shaft W5 comprises the common planetary carrier 63 (entire planetary carrier) in the third embodiment. Expressed again in other words, in the third embodiment it is provided that the element section of the fifth shaft W5 has the entire planetary carrier or is formed by the entire planetary carrier. Furthermore, in the third embodiment it is provided that the ring gear 94 is connected to the sun gear 52, in particular permanently, for conjoint rotation, so that the ring gear 94 and the sun gear 52 form the shaft W1. In other words, the shaft W1 has the sun gear 52 and the ring gear 94, so that a first element section of the shaft W1 is or has the sun gear 52 or is formed by the sun gear 52, and so that a second element section of the shaft W1 is or has the ring gear 94 or is formed by the ring gear 94.

Furthermore, in the third embodiment, the sun gear 90 is connected to the sun gear 60, in particular permanently, for conjoint rotation, whereby the sun gears 90 and 60 form the third shaft W3. In other words, the shaft W3 has the sun gears 60 and 90, so that a first element section of the shaft W3 is or has the sun gear 60 or is formed by the sun gear 60, and so that a second element section of the shaft W3 is or has the sun gear 90 or is formed by the sun gear 90.

Furthermore, the ring gears 64 and 56 are connected to each other, in particular permanently, for conjoint rotation, whereby the ring gears 64 and 56 form the shaft W4. In other words, the shaft W4 has the ring gears 64 and 56. Thus, it is provided that a first element section of the shaft W4 is or has the ring gear 64 or is formed by the ring gear 64, and so that a second element section of the shaft W4 is or has the ring gear 56 or is formed by the ring gear 56. The shaft W2 has the third planetary carrier 92, so that the element section of the shaft W2 has the planetary carrier 92 or is formed by the planetary carrier 92.

Overall, it can be seen that the shaft W1 has the sun gear 52 and the ring gear 94, which are connected to each other, in particular permanently, for conjoint rotation. The shaft W2 has the planetary carrier 92. The shaft W3 has the sun gears 60 and 90 which are connected to each other, in particular permanently, for conjoint rotation. The shaft W4 has the ring gears 56 and 64 which are connected to each other, in particular permanently, for conjoint rotation. The shaft W5 has the common planetary carrier 63 and thus the planetary carriers 54 and 62, which are connected to each other, in particular permanently, for conjoint rotation.

In the third embodiment, the shaft W4 is connected to the input of the transmission stage 46, i.e., to the sun gear 70 of the planetary gear set 66, in particular permanently, in a torque-transmitting manner, in particular for conjoint rotation. The shaft W5 is connected to the input of the transmission stage 48, i.e., to the sun gear 72 of the planetary gear set 68, in particular permanently, in a torque-transmitting manner, in particular for conjoint rotation. In the second embodiment, the shaft W5 is connected to the input of the transmission stage 48, i.e., to the sun gear 72 of the planetary gear set 68, in particular permanently, in a torque-transmitting manner, in particular for conjoint rotation.

In the first embodiment, the shaft W4 is connected to the input of the transmission stage 46, i.e., to the sun gear 70 of the planetary gear set 66, in particular permanently, in a torque-transmitting manner, in particular for conjoint rotation. In the first embodiment, the shaft W5 is connected to the input of the transmission stage 48, i.e. to the sun gear 72 of the planetary gear set 68, in particular permanently, in a torque-transmitting manner, in particular for conjoint rotation.

In the third embodiment, the shaft W1 can be connected to the second rotor 22 of the second electric engine 18 by means of the switching element S1, in a torque-transmitting manner, in particular for conjoint rotation. By means of the second switching element S2, the sixth shaft W6 can be connected to the third shaft W3. Also, the second shaft W2 can be connected to the sixth shaft W6 and thus to the first rotor 20 by means of the switching element S3.

In the second embodiment, the fourth shaft W4 can be connected to the sixth shaft W6 by means of the switching element S3 for conjoint rotation. In the embodiments, the transmission stages 46 and 48 are arranged coaxially to each other and coaxially to the planetary gearbox 42 and coaxially to the electric engines 16 and 18. In the third embodiment, the third planetary gear set 88 is arranged coaxially to the planetary gear sets 50 and 58 and also coaxially to the transmission stages 46 and 48 and coaxially to the electric engines 16 and 18. The sun gear 90, the planetary carrier 92 and the ring gear 94 can be rotated as further gear elements around the shaft rotational axis 44 relative to the housing 28.

In the third embodiment, the planetary gearbox 42 also has the planetary gears P1, P2, and P3. Furthermore, the planetary gearbox 42 has fourth planetary gears P4, which in particular, are planetary gears of the third planetary gear set 88. The fourth planetary gears P4 are rotatably mounted on the planetary carrier 92. The first planetary gears P1 mesh with the first sun gear 52 and with the second planetary gears P2. The first planetary gears P1 do not mesh with the first ring gear 56, the third planetary gears P3, the second sun gear 60, the second ring gear 64, the third sun gear 90, the fourth planetary gears P4, and the third ring gear 94.

The second planetary gears P2 mesh with the first planetary gears P1 and with the first ring gear 56. The second planetary gears P2 do not mesh with the first sun gear 52, the third planetary gears P3, the second sun gear 60, the second ring gear 64, the third sun gear 90, the fourth planetary gears P4, and the third ring gear 94.

The third planetary gears P3 mesh with the second sun gear 60 and with the second ring gear 64. The third planetary gears P3 do not mesh with the first sun gear 52, the first planetary gears P1, the first ring gear 56, the second planetary gears P2, the third sun gear 90, the fourth planetary gears P4, and the third ring gear 94.

The fourth planetary gears P4 mesh with the third sun gear 90 and with the third ring gear 94. The fourth planetary gears P4 do not mesh with the first sun gear 52, the first planetary gears P1, the first ring gear 56, the third planetary gears P3, the second sun gear 60, the second planetary gears P2, and the second ring gear 64.

It can also be seen from FIG. 3 that the third planetary gear set 88 is arranged in the axial direction of the drive train 10, and thus as viewed along the shaft rotational axis 44, between the electric engines 16 or 18, in particular in such a way that the planetary gear set 88 is arranged on a side of the electric engine 16 facing towards the electric engine 18 in the axial direction of the drive train 10, and so that the planetary gear set 88 is arranged on a side of the electric engine 18 facing towards the electric engine 16 in the direction of the drive train 10 and facing away from the planetary gear sets 50 and 58. Consequently, the planetary gear sets 50 and 58 are arranged one a side of the electric engine 18 facing away from the third planetary gear set 88 in the axial direction of the drive train 10.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

10 electric drive train
    12 first vehicle wheel
    14 second vehicle wheel
    16 first electric engine 18 second electric engine
20 first rotor
22 second rotor
24 first stator
26 first engine rotational axis
28 housing
30 second stator
32 second engine rotational axis
34 rotor element
36 rotor element
38 rotor element
40 rotor element
42 planetary gearbox
44 shaft rotational axis
46 first transmission stage
48 second transmission stage
50 first planetary gear set
52 first sun gear
54 first planetary carrier
56 first ring gear
58 second planetary gear set
60 second sun gear
62 second planetary carrier
63 common planetary carrier
64 second ring gear
66 planetary gear set
68 planetary gear set
70 sun gear
72 sun gear
74 planetary carrier
76 planetary carrier
78 ring gear
80 ring gear
82 planetary gear
84 planetary gear
86 first input shaft
88 third planetary gear set
90 third sun gear
92 third planetary carrier
94 third ring gear
P1 first planetary gear
P2 second planetary gear
P3 third planetary gear
P4 fourth planetary gear
S1 first switching element
S2 second switching element
S3 third switching element
W1 first shaft
W2 second shaft
W3 third shaft
W4 fourth shaft
W5 fifth shaft
W6 sixth shaft

The invention claimed is:

1. An electric drive train for a motor vehicle, the electric drive train comprising:

a first electric engine comprising a first rotor;

a second electric engine comprising a second rotor;

a planetary gearbox comprising a first shaft, a second shaft, a third shaft, a fourth shaft, and a fifth shaft;

a first vehicle wheel;

a second vehicle wheel, wherein, with regard to a torque flow originating from the first and second electric engines and running to the first and second vehicle wheels, the first and second electric engines are arranged upstream of the planetary gearbox, and the planetary gearbox is arranged upstream of the first and second vehicle wheels in the torque flow;

a first switching element configured to couple the second rotor to the first shaft in such a way that torques suppliable by the second electric engine via the second rotor are introducible at the first shaft into the planetary gearbox;

a second switching element, which is a power shift switching element and is configured to connect the third shaft to a sixth shaft to conjointly rotate;

a third switching element, which is a form-fitting coupling configured to connect the second shaft or the fourth shaft to the sixth shaft of the electric drive train to conjointly rotate;

a first transmission stage which, with regard to the torque flow, is arranged downstream of the planetary gearbox and upstream of the first vehicle wheel in the torque flow, wherein the fourth shaft is coupled to or is couplable to the first vehicle wheel via the first transmission stage; and a second transmission stage which, with regard to the torque flow, is arranged downstream of the planetary gearbox and upstream of the second vehicle wheel in the torque flow, wherein the fifth shaft is coupled to or is couplable to the second vehicle wheel via the second transmission stage, and wherein a first transmission of the first transmission stage is different than a second transmission of the second transmission stage.

2. The electric drive train of claim 1, wherein the planetary gearbox comprises a first planetary gear set and a second planetary gear set, a first planetary carrier of the first planetary gear set and a second planetary carrier of the second planetary gear set are connected to each other to conjointly rotate and form a common planetary carrier, one of the first, second, third, fourth, and fifth shafts of the planetary gearbox comprises the common planetary carrier.

3. The electric drive train of claim 2, wherein the first shaft comprises one sun gear of the planetary gearbox, wherein the third shaft comprises another sun gear of the planetary gearbox or one ring gear of the planetary gearbox.

4. The electric drive train of claim 3, wherein the sixth shaft is coupled to or is couplable to the first rotor and, with regard to the torque flow, is arranged between the first rotor and the planetary gearbox in the torque flow.

5. The electric drive train of claim 4, wherein the first shaft comprises a first of the sun gears;

the third shaft comprises a second of the sun gears;

the second shaft comprises the common planetary carrier;

the fifth shaft comprises a first one of ring gears of the planetary gearbox; and the fourth shaft comprises a second one of the ring gears of the planetary gearbox.

6. The electric drive train of claim 5, wherein first planetary gears, second planetary gears, and third planetary gears of the planetary gearbox are rotatably mounted on the common planetary carrier;

the first planetary gears mesh with the first of the sun gears and with the second planetary gears;

the second planetary gears mesh with the first ring gear and with the second of the sun gears; and the third planetary gears mesh with the second planetary gears and with the second ring gear.

7. The electric drive train of claim 4, wherein the sixth shaft is connected to the first rotor to conjointly rotate.

8. The electric drive train of claim 3, wherein the sixth shaft is connected to a first input shaft of the first transmission stage to conjointly rotate and, with regard to the torque flow, is arranged downstream of the planetary gearbox in the torque flow.

9. The electric drive train of claim 8, wherein the first shaft comprises a first of the sun gears of the planetary gearbox;

the second shaft comprises a first one of ring gears of the planetary gearbox;

the third shaft comprises a second of the ring gears of the planetary gearbox;

the fourth shaft comprises a second one of the sun gears of the planetary gearbox; and the fifth shaft comprises the common planetary carrier.

10. The electric drive train of claim 9, wherein first planetary gears, second planetary gears, and third planetary gears are rotatably mounted on the common planetary carrier;

the first planetary gears mesh with the first of the sun gears and with the first ring gear;

the second planetary gears mesh with the second of the sun gears and with the first planetary gears; and the third planetary gears mesh with the second planetary gears and with the second ring gear.

11. The electric drive train of claim 2, wherein transmission ratios are selected inside of the first planetary gear set and inside of the second planetary gear set in such a way that, originating from the first electric engine, torque resulting on the first vehicle wheel via a first torque transmission path up to the first vehicle wheel is same as torque resulting on the second vehicle wheel via a second torque transmission path up to the second vehicle wheel, the first torque transmission path runs from the first electric engine, continues via the sixth shaft, continues via the second shaft, continues via the fourth shaft, continues via the first transmission stage up to the first vehicle wheel, and the second torque transmission path runs from the first electric engine, continues via the sixth shaft, continues via the second shaft, continues via the fifth shaft, continues via the second transmission stage up to the second vehicle wheel.

\*  \*  \*  \*  \*